Oct. 5, 1971   C. STAPELMANN   3,610,077
LATHE CENTER DEVICE AND METHOD
Filed July 11, 1969   2 Sheets-Sheet 1
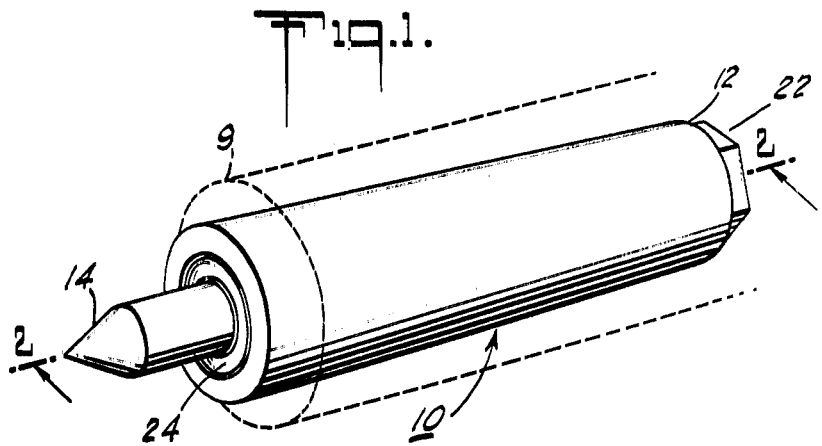
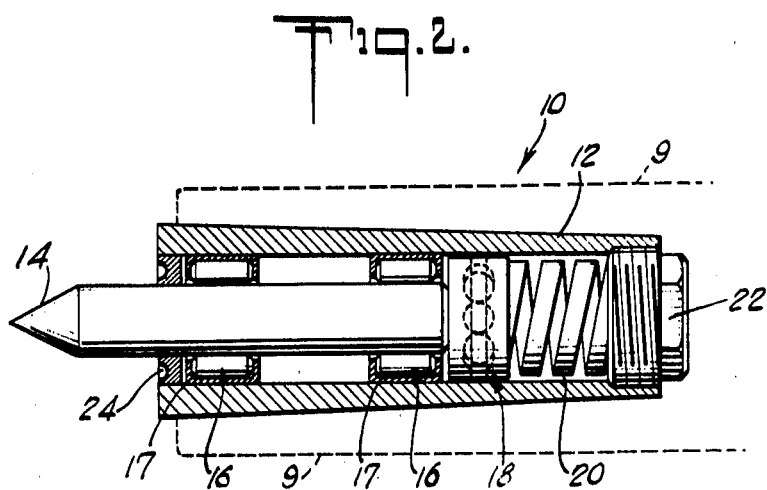
INVENTOR:
CLAUS STAPLEMANN
BY
Curtis, Morris & Safford
ATTORNEYS.

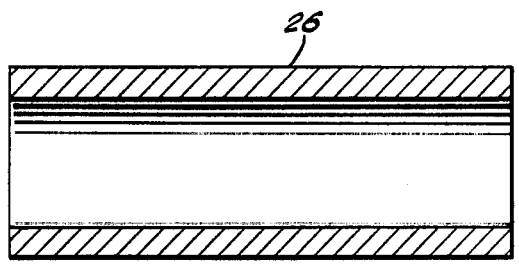
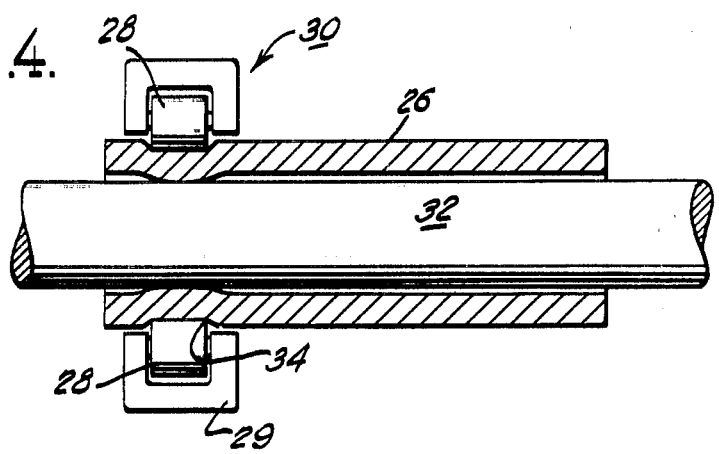
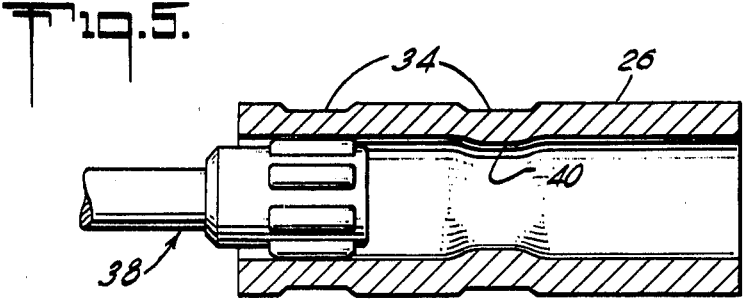
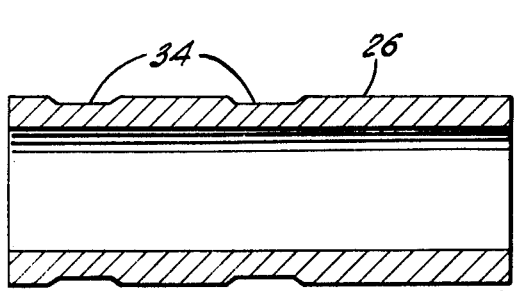

3,610,077
Patented Oct. 5, 1971

3,610,077
LATHE CENTER DEVICE AND METHOD
Claus Staplemann, Dover, N.J., assignor to Climax
Engineering Co., Goleta, Calif.
Filed July 11, 1969, Ser. No. 840,958
Int. Cl. B23b 23/04
U.S. Cl. 82—33                     12 Claims

ABSTRACT OF THE DISCLOSURE

The lathe center device is composed of an outer housing, a spindle for supporting a work piece, and at least one set of bearings which support the spindle within the outer housing. During fabrication of the center device, the housing is swaged so as to indent the housing sections where the bearings are to be seated. The indented portions are then roller-burnished so as to form improved bearing seats which increase bearing stability and prolong the life of the center device.

---

This invention relates to devices for rotatably supporting work pieces on lathes, commonly known as "centers." More particularly this invention relates to "live" centers and to methods used in manufacturing such devices.

Two major types of center devices are "solid" centers and "live" centers. The solid center consists of a solid metal rod shaped to a point at one end. As a work piece is rotated by a lathe, the supporting solid center remains stationary. Thus, friction is created at the point of contact between the work piece and the center. This friction results in wear at the contact point which often causes a shifting of the work piece. Since such shifting cannot be tolerated in accurate work, centers with shafts which rotate with the work piece are used for such work. Such centers with rotating shafts are called "live" centers.

In "live" centers, the solid pointed rod is supported in the outer case by bearings. Frequently, however, after some use, the races which hold these bearings become loose, with the result that there is a shifting of the work piece.

One of the objects of the present invention is to provide a live center possessing improved bearing race stability. This object is met by providing a prestressed and compresed seat for the bearing races.

Another object of this invention is to provide steps which may be added to any live lathe center fabrication process to increase bearing location stability and thus increase the life of the center device. This object is met by cold working and compacting the housing metal forming the seats for the bearings in the housing. The preferred embodiment of the method is a two step procedure. First, pressure is applied to the outside of the center housing to create a permanent deformation in both the housing's internal and external diameters. Next, the interior of the housing is returned to its original dimensions by rotating a tool, such as a burnishing tool, inside the housing.

The invention now will be described with the assistance of the drawings in which:

FIG. 1 is a perspective view of a preferred embodiment of the present invention;

FIG. 2 is a cross-sectional view taken along line 2—2 of FIG. 1;

FIG. 3 is a cross-sectional view of the housing of the center device before swaging;

FIG. 4 is a partial cross-sectional view of the housing during swaging;

FIG. 5 is a partial cross-sectional view of the housing during burnishing; and

FIG. 6 is a cross-sectional view of the housing after burnishing.

The assembled center device 10 is shown in FIGS. 1 and 2 clamped in the "tail stock" holding device 9 of a lathe (not shown). The center device 10 includes a rotary spindle 14, which is a hardened and tempered pointed steel rod. The spindle 14 is supported radially by two sets of enclosed needle roller bearings 16 rotatably mounted in races 17 which are seated within a housing 12. An enclosed ball thrust bearing 18 is slidably mounted in the housing 12 and supports the spindle 14 axially and is forced against the spindle rod by a spring 20. A plug 22 threads into the end of housing 12 and provides support for the spring 20. A packing ring 24 closes the open end of the housing to provide a lubrication seal between the housing and the rotating spindle.

In operation, the center 10 is first clamped into the lathe tail stock 9. Then the tail stock is moved to the work piece until the pointed end of the spindle 14 contacts the work piece. Further movement of the tail stock forces the spindle back into the housing, thus compressing the spring 20. When the lathe is activated and the work piece is rotated, the spindle 14 rotates in its supporting bearings with the work piece.

FIGS. 3 through 6 illustrate two of the steps taken in the preferred process of this invention. FIG. 3 shows a steel tube 26 which is used to form the housing 12.

The first step in the process, as is illustrated in FIG. 4, comprises swaging the outside of the tube 26 with a swaging tool 30 with an arbor 32 inside the tube to limit the amount of deformation caused by the swaging tool. The swaging tool 30 is of conventional construction and has four steel rollers 28 rotatably mounted in a frame 29. The rollers 28 are located at about 90° intervals around the periphery of the frame 29. A threaded adjustment device (not shown) of the type used in rotary pipe cutters is used to move two of the rollers towards or away from the other rollers. As the frame 29 and the rollers 28 are rotated about the tube 26, the rollers are moved gradually closer together by means of the adjustment device, and the exterior of the tube 26 is indented as shown at 34, and the internal wall of the tube bulges inwardly as shown at 40.

The next step in the fabrication process is illustrated in FIG. 5. A roller burnishing tool 38 is inserted into the tube 26 and is rotated against the indented metal portions 40 until they once again have the same diameter as the remainder of the tube 26. Preferably, the outside of the tube 26 shown in FIG. 6 then is turned down to smooth out the external indentations 34 and give the housing the tapered shape shown in FIG. 2.

After the housing 12 is completed and internal threads are cut into its right end, the roller bearing races 17 are force-fitted in the housing 12, the thrust bearing 18, spring 20 and the plug 22 are assembled, and the spindle 14 is fitted axially into the bearings with a slight friction fit. Lubricant and the oil seal 24 are added to complete the assembly.

In an illustrative specific example of the process, the tube 26 preferably is made of SAE 1015 seamless steel tubing. The outside diameter of the tube 26 is 1.000 inch, and its inside diameter is 0.687 inch before swaging. After swaging, the inside diameter of the tube in regions 40 is 0.683 inch. After the roller burnishing step is completed, the internal diameter of the tube in the regions 40 is once again 0.687 inch, but the outside diameter in the indented regions 25 now is 0.9985. The roller burnishing tool is a conventional internal roller burnishing tool such as that sold under the trademark "Microroller" by Madison Industries, Inc., Providence, R.I.

It is not known precisely why the bearing seats formed by the foregoing process last longer than those in other live center devices, but it is believed that the process both compacts and pre-stresses the metal forming the seats.

The compacting and pre-stressing hardens and cold-works the metal in much the same manner as do the bearings themselves during use of an ordinary center device. Thus, the seats are believed to be much more resistant to deformation, and the bearings remain tightly seated longer than in prior lathe center devices. This adds considerably to the life of the device.

Although the preceding presentation has illustrated and described one possible embodiment of this invention and one possible procedure which can be used during fabrication of the center device, it is to be understood that various changes and modifications may be made without departing from the spirit and scope of the invention as defined in the following claims.

I claim:

1. A center device for lathes, said device consisting of a rotary support for holding one end of a work piece, at least one set of bearings and a tubular metal housing, said rotary support being rotatably mounted within the housing by means of said bearings, the wall of the housing having a cold-compacted portion at the location of the bearings, said cold-compacted portion having an internal surface which is of substantially the same diameter as the remaining internal portion of said housing.

2. A center device for lathes as described in claim 1, in which said cold-compacted portion has a reduced external diameter.

3. A center device for lathes as described in claim 2 in which said housing is tubular and has an internal threaded portion at one of its ends, and a plug threaded into said end.

4. A center device for lathes as described in claim 1, said rotary support comprising a solid metal round rod having a flat end and pointed end for holding one end of a work piece, two parallel sets of enclosed needle roller bearings, said rod being rotatably supported in said housing by said bearings, a spacing ring, the pointed end of the rod extending through said packing ring, a ball thrust bearings, said thrust bearing axially supporting a rod at its flat end, a spring pressing against said thrust bearing, and a plug holding said spring in said housing, with the inner surface of said housing being roller-burnished at the locations of said bearings.

5. In a process for fabricating lathe center devices, the steps of forming a tubular metal housing having at least one portion whose inside diameter is less than the inside diameter of another portion of said housing and increasing said inside diameter of said one portion to be equal to that of said other portion by rotating a tool in said tubing and cold working and compressing the metal in said one portion.

6. A process as described in claim 5, including the step of seating bearings in each said housing portion which has been increased in diameter.

7. A process as described in claim 5, including the step of reducing the outer diameter of said tubular housing to form said one portion of reduced inner diameter.

8. A process as described in claim 5 in which said step of increasing the inside diameter of at least one portion of the housing is accomplished by roller burnishing.

9. A process as described in claim 7, in which said reducing step comprises swaging with a roller swaging tool.

10. A process as described in claim 7, including seating a roller bearing structure in said one portion of said housing, and inserting a rotary lathe center spindle into said roller bearing structure.

11. In a process for fabricating lathe center devices, the steps of providing a tubular metal housing with a portion having an inside diameter which is less than the inside diameter of another portion of said housing, increasing the inside diameter of the first-named portion of said housing until it is approximately equal to the diameter of said other portion by rotating a roller burnishing tool in said housing, seating a roller bearing structure in said portion of said housing, and inserting a rotary lathe center spindle into said roller bearing structure.

12. A process as described in claim 11, including the step of decreasing the inside diameter of said tubular housing by swaging the outside of said housing prior to said roller burnishing step.

References Cited

UNITED STATES PATENTS

| | | | |
|---|---|---|---|
| 835,729 | 11/1906 | Horton | 72—121 X |
| 1,412,538 | 4/1922 | Mills | 29—90 |
| 2,170,631 | 8/1939 | Gogsdill | 29—90 |
| 2,520,473 | 8/1950 | Shepard | 82—33 |
| 2,557,722 | 6/1951 | Brauchler | 72—370 X |

FOREIGN PATENTS 1,001,291  10/1951  France.

LEONIDAS VLACHOS, Primary Examiner

U.S. Cl. X.R.

29—525; 72—370

PO-1050
(5/69)

UNITED STATES PATENT OFFICE
CERTIFICATE OF CORRECTION

Patent No. 3,610,077      Dated October 5, 1971

Inventor(s) Claus Stapelmann

It is certified that error appears in the above-identified patent and that said Letters Patent are hereby corrected as shown below:

Column 1, line 3, change "Staplemann" to --Stapelmann--; and change "Dover, N.J." to --Santa Barbara, California--.

Column 3, line 37, change "spacing" to --packing--.

Signed and sealed this 7th day of March 1972.

(SEAL)
Attest:

EDWARD M. FLETCHER, JR.
Attesting Officer

ROBERT GOTTSCHALK
Commissioner of Patents